United States Patent [19]

Kinoshita

[11] Patent Number: 5,138,700
[45] Date of Patent: Aug. 11, 1992

[54] METHOD AND APPARATUS FOR MAGNIFYING DISPLAY DATA GENERATED IN A COMPUTER SYSTEM USING AN OVERHEAD PROJECTOR

[75] Inventor: Kiyoshi Kinoshita, Kokubunji, Japan

[73] Assignee: Kabushiki Kaisha Toshiba, Kawasaki, Japan

[21] Appl. No.: 730,388

[22] Filed: Jul. 15, 1991

Related U.S. Application Data

[63] Continuation of Ser. No. 300,982, Jan. 24, 1989, abandoned.

[30] Foreign Application Priority Data

Jan. 27, 1988 [JP] Japan .................................. 63-14636

[51] Int. Cl.⁵ ............................................. G06F 15/20
[52] U.S. Cl. ................................... 395/161; 395/139; 353/42
[58] Field of Search ................ 395/155, 161, 139; 340/707–710, 721, 723; 350/331 R, 338, 345, 445, 452; 353/28, 35, 42, 122, DIG. 3; 382/47; 434/118

[56] References Cited

U.S. PATENT DOCUMENTS

| | | | |
|---|---|---|---|
| 4,538,993 | 9/1985 | Krumholz ........................... | 434/118 |
| 4,652,101 | 3/1987 | Grunwald ................. | 353/DIG. 3 X |
| 4,679,909 | 7/1987 | Hamada et al. ................. | 340/707 X |
| 4,756,604 | 7/1988 | Nakatsuka et al. ............. | 350/331 R |
| 4,779,134 | 10/1988 | Mak ................................. | 358/185 X |
| 4,818,074 | 4/1989 | Yokoi et al. ................ | 350/331 R X |
| 4,819,190 | 4/1989 | Hinman et al. .................. | 382/47 X |
| 4,846,694 | 7/1989 | Erhardt ............................ | 340/707 X |

FOREIGN PATENT DOCUMENTS

| | | |
|---|---|---|
| 2585166 | 1/1987 | France . |
| 52-24493 | 2/1977 | Japan . |
| 61-143174 | 9/1986 | Japan . |
| 86/07164 | 12/1986 | PCT Int'l Appl. . |
| 2089616 | 6/1982 | United Kingdom . |

OTHER PUBLICATIONS

Information Display, "Graphics Imager Allows Check of Designs-In-Progress," vol. 2, No. 7.

Primary Examiner—Heather R. Herndon
Attorney, Agent, or Firm—Finnegan, Henderson, Farabow, Garrett and Dunner

[57] ABSTRACT

To magnify display data generated by a lap-top type computer using a magnifying display unit having a transmission type liquid crystal display (LCD) and an overhead projector (OHP) apparatus, a display control apparatus is set between the lap-top type computer and the magnifying display unit. The display control apparatus is connected via an interface to the lap-top type computer. The display data is stored in the display control apparatus. The stored display data is output to the LCD in a predetermined timing so that it is magnified by the OHP apparatus.

10 Claims, 2 Drawing Sheets

METHOD AND APPARATUS FOR MAGNIFYING DISPLAY DATA GENERATED IN A COMPUTER SYSTEM USING AN OVERHEAD PROJECTOR

This application is a continuation of application Ser. No. 07/300,982, filed 01/24/89.

BACKGROUND OF THE INVENTION

1. Field of the Invention

The present invention relates to a method for magnifying display data generated in a computer system and apparatus for carrying out the same.

2. Description of the Related Art

In place of a conventional desk-top type computer, a lap-top type computer which is compact, light in weight and portable has increasingly been used as office automation equipment and so on.

When a document to be released is prepared utilizing the word-processing function, etc., of the lap-top type computer, a hard copy of the document is made, for example, by a printer and then the image of the copy is converted by an overhead projector (OHP) to an OHP image. Recently, a combined unit of a transmission type liquid crystal display (LCD) and OHP apparatus has been commercialized. The document generated in the lap-top type computer is magnified by connecting the combined unit to the lap-top type computer. It is, therefore, not necessary to prepare an OHP film. This combined unit has only a CRT (cathode ray tube) interface.

An ordinary computer has a CRT interface and can utilize the aforementioned combined unit having only a CRT interface. The lap-top type computer has a flat panel display, such as a liquid crystal, plasma or electroluminescence (EL) display. However, when the flat panel display is used in the lap-top type computer, the combined unit cannot be utilized in the lap-top type computer. If the combined unit is utilized, then it will be necessary to re-design an inner arrangement of the lap-top type computer.

There is a demand for a display image magnifying apparatus which can magnify display data without the need of modifying an inner arrangement of a lap-top type computer equipped with a flat panel display, using a transmission type LCD and an OHP apparatus.

SUMMARY OF THE INVENTION

It is accordingly the object of the present invention to provide a method for magnifying display data generated in a computer system and apparatus for carrying out the same.

According to one aspect of the present invention, there is provided a method for magnifying display data generated in a computer system, the method comprising the steps of: generating first display data; outputting driving signals in accordance with the generated first display data; displaying second display data in accordance with the output driving signals; and magnifying the displayed second display data.

According to another aspect of the present invention, there is provided a display system comprising: a computer system; outputting means for outputting driving signals in accordance with the first display data generated by the computer system; display means for displaying second display data in accordance with the driving signals output by the outputting means; and magnifying means for magnifying the second display data displayed by the display means.

DETAILED DESCRIPTION OF THE PREFERRED EMBODIMENT

The embodiment of the present invention will be explained below with reference to the accompanying drawings.

Figure 1:
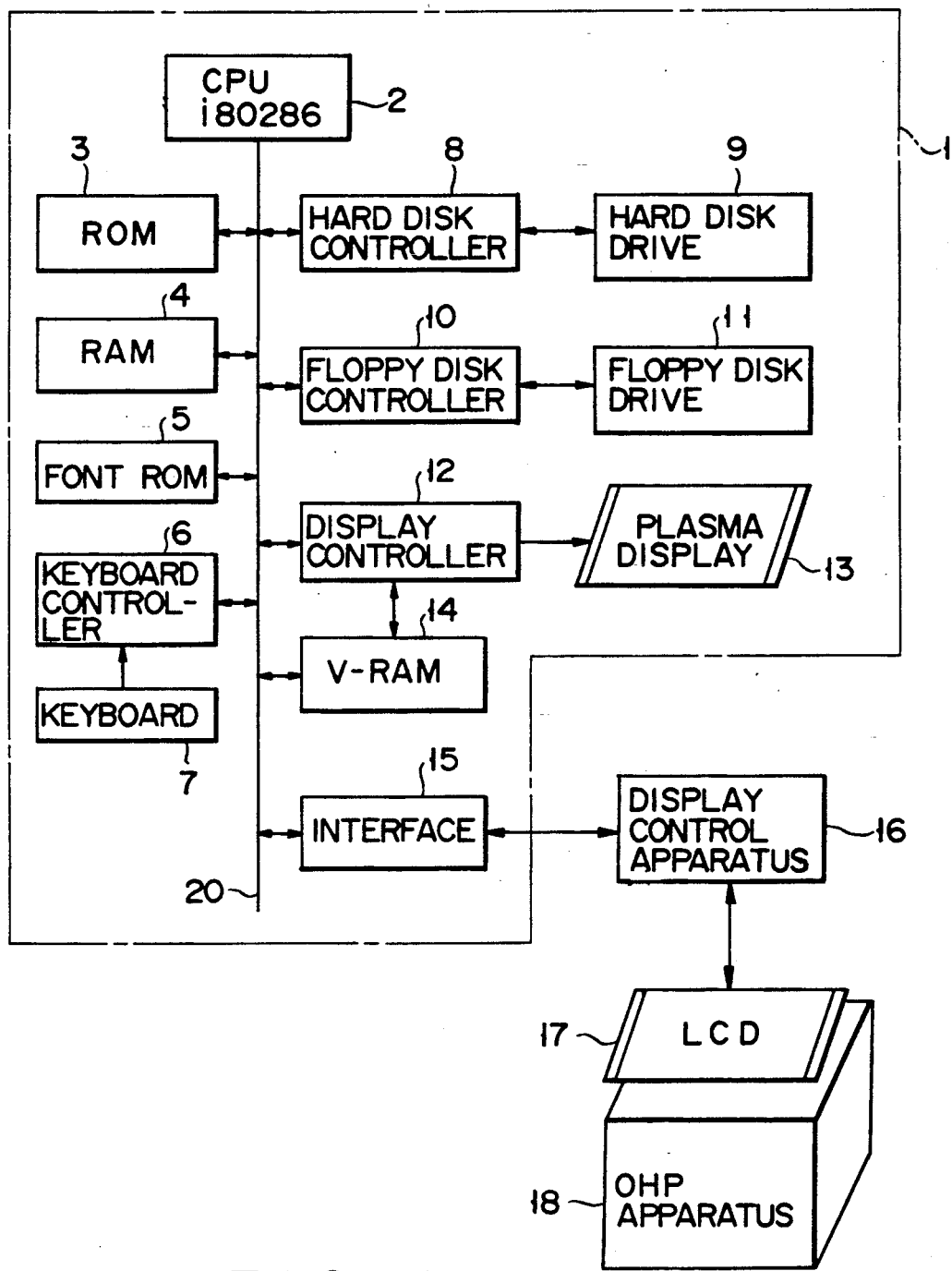
FIG. 1 is a block diagram showing an arrangement of a display system according to one embodiment of the present invention.

In FIG. 1, the present system includes lap-top type computer 1, display control apparatus 16, transmission type LCD 17, and OHP apparatus 18.

Lap-top type computer 1 includes central processing unit (CPU) 2 which is made up of i80286 of Intel Corp. (U.S.A.), ROM (Read Only Memory) 3 for storing a program, RAM (Random Access Memory) 4, Font ROM 5, keyboard controller 6, keyboard 7, hard disk controller 8, floppy disk controller 10, display controller 12, V-RAM (Video-Random Access Memory) 14 for storing display data, and interface 15. These are connected to bus 20. Lap-top type computer 1 further includes hard disk drive 9 connected to hard disk controller 8, floppy disk drive 11 connected to floppy disk controller 10, and plasma display 13 connected to display controller 12. Interface 15 is connected to display control apparatus 16 which is connected to LCD 17 on OHP apparatus 18. Display controller 12 is connected to V-RAM 14.

Figure 2:
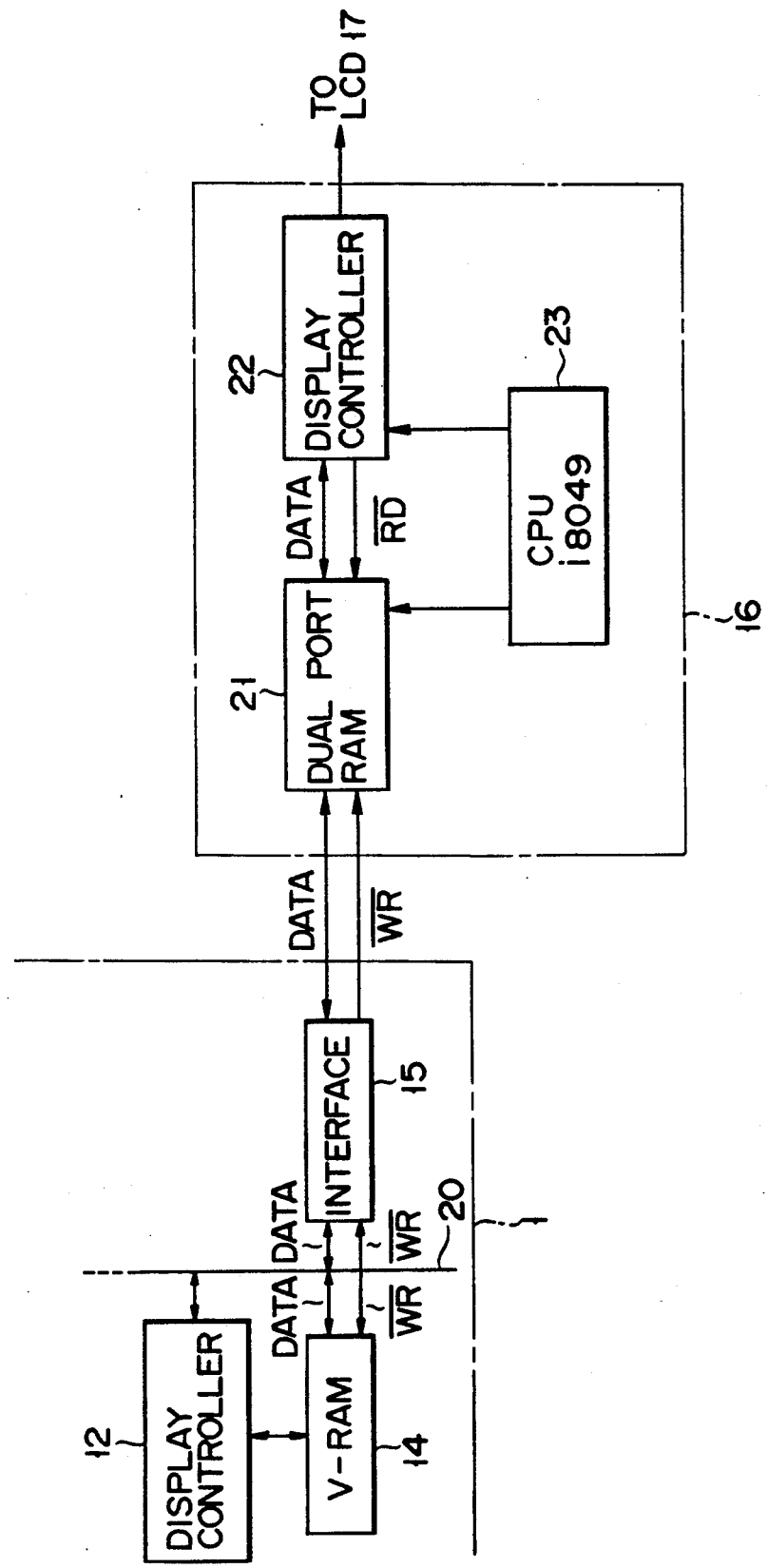
FIG. 2 is a block diagram showing an arrangement of a display control apparatus of the embodiment of the present invention.

In FIG. 2, display control apparatus 16 is constructed of a one-chip CPU 23 made up of i8049 (Intel Corp. U.S.A.) and connected to dual port RAM 21 for storing display data generated in lap-top type computer 1 and to display controller 22 for controlling LCD 17.

The operation of the present invention will be explained below in more detail.

Display data generated by lap-top type computer 1 is written in accordance with a write signal $\overline{WR}$ into V-RAM 14 and into dual port RAM 21 via interface 15. Display data thus written into dual port RAM 21 is read out by a read signal $\overline{RD}$ of display controller 22 in accordance with a predetermined timing and, after being converted to an LCD drive signal, transferred to LCD 17. By the aforementioned operation, the display data generated by lap-top type computer 1 is displayed on transmission type LCD 17 and magnified by OHP apparatus 18. The display data stored in V-RAM 14 is also displayed on plasma display 13, at the same time.

Under the control of CPU 23, the display data on plasma display 13 of lap-top type computer 1 and the display data magnified by OHP apparatus 18 via LCD 17 can be displayed with a delay of a predetermined time.

Although the display system has been explained in connection with the embodiment of the present invention, it is not restricted to the aforementioned embodiment. The present invention can be changed or modified in a variety of ways without departing from the spirit and scope of the present invention.

What is claimed is:

1. A magnification-display system for a computer system for generating display data, comprising:

first display means for displaying the display data when the display data is generated in the computer system;
interface means for transmitting the display data generated in the computer system;
second display means for displaying the display data transmitted by the interface means; and
magnification-display means, including an overhead projector, for magnifying and displaying the display data displayed on the second display means.

2. The system according to claim 1, wherein the second display means includes a transmission type liquid crystal display.

3. The system according to claim 1, wherein the interface means includes:
storing means for storing the display data generated in the computer system, and
drive-controlling means for controlling the second display means in accordance with the stored display data.

4. The system according to claim 3, wherein the interface means further comprises timing-controlling means for controlling the storing means and the drive-controlling means in accordance with a predetermined timing.

5. A magnification-display system according to claim 1, wherein said first display means comprises a flat panel display.

6. A magnification-display system according to claim 1, further comprising:
bus means for transferring the display data to the computer system and to the interface means.

7. A method of displaying and magnifying data for a computer system having a first display device and being connectable to a second display device, comprising the steps of:
generating display data in the computer system;
displaying the display data on the first display device;
outputting the display data to the second display device;
displaying the display data on the second display device; and
magnifying and displaying the display data displayed on the second display device, wherein said display data is supplied from the computer system to the second display device when sad display data is generated in the computer system and when the second display device is coupled to the computer system.

8. The method according to claim 7, wherein the outputting step includes the step of
storing the display data.

9. A display system comprising:
a computer including a bus, a display screen, a first memory for storing data sent through the bus, a first display controller for controlling display of the data on the display screen, and an expansion interface connected to the bus;
a display control apparatus connected to the expansion interface and including a second memory for storing the data sent through the bus and the expansion interface, and a second memory controller for outputting the data from the display control apparatus;
a transmission type liquid crystal display for displaying the data sent from the second display controller; and
an overhead projector for magnifying the data displayed on the transmission type liquid crystal display.

10. The display system according to claim 9, wherein the computer is a lap-top computer.

* * * * *

UNITED STATES PATENT AND TRADEMARK OFFICE
CERTIFICATE OF CORRECTION

PATENT NO. :  5,138,700
DATED      :  August 11, 1992
INVENTOR(S) : Kiyoshi Kinoshita It is certified that error appears in the above-identified patent and that said Letters Patent is hereby corrected as shown below:

Claim 7, column 4, line 9, change "sad" to --said--.

Signed and Sealed this

Fourth Day of January, 1994

Attest:

BRUCE LEHMAN

Attesting Officer

Commissioner of Patents and Trademarks